Inventor
Ernest Wildhaber
Attorney

Fig. 7

Patented June 18, 1940

2,204,714

UNITED STATES PATENT OFFICE 2,204,714

METHOD OF RELIEF GRINDING CUTTER BLADES

Ernest Wildhaber, Irondequoit, N. Y., assignor to Gleason Works, Rochester, N. Y., a corporation of New York Original application May 20, 1935, Serial No. 22,304. Divided and this application October 29, 1937, Serial No. 171,712

7 Claims. (Cl. 51—288)

The present invention relates to face-mill gear cutters and to their manufacture. The invention comprises a novel form of cutter, a novel method of sharpening the same and a novel method and novel apparatus for relief grinding the blades of face-mill gear cutters. This application is a division of my copending application, Serial No. 22,304, filed May 20, 1935, and which is now Patent No. 2,129,077. The present application is confined to the novel method and apparatus for relief-grinding the blades of face-mill gear cutters.

Various methods have heretofore been used for relief-grinding the blades of face-mill gear cutters. In one method, the blades to be ground are mounted in a dummy head so that they are tilted out of cutting position and their relieved top surfaces lie in a plane perpendicular to the axis of the dummy head. The top and side surfaces of the blades may then be ground by rotating a grinding wheel in engagement with the blades while rotating the dummy head on its axis to pass the different blades successively across the wheel. When the blades are returned to their own head and mounted in erect position, they will have the desired side and top cutting clearance. With this method, both sides and the tops of the blades may be relief-ground simultaneously. The pressure angles of the sides of the blades will change, however, from front to rear and hence blades ground by this method are only suitable for use in rough cutting.

In another method, the blades to be ground are also mounted in a dummy head but in this case, the blades are adjusted sidewise relative to the positions which they occupy during cutting, by the amount of clearance angle which it is desired to grind on the sides of the blades. The relief-grinding operation then, is effected by rotating the grinding wheel in engagement with the blades while rotating the dummy head on its axis to carry the different blades successively across the grinding wheel. This method of relief grinding requires three dummy heads, one for the top and one each for the two sides of the blades. The method is accurate, however, and blades ground by this method may, therefore, be employed for finish-cutting.

In still another prior method of relief-grinding the blades of face-mill gear cutters, the blades are ground in their own heads and the relief-grinding is effected by rotating a grinding wheel in engagement with the blades while rotating the head on its axis and while simultaneously effecting a relative reciprocating movement between the wheel and head axially of the head as each blade passes across the wheel. Blades relief-ground in this way are correct.

The first two methods of relief-grinding described are suitable only for relief-grinding the blades of inserted-blade type gear cutters. Neither method can be used for the relief-grinding of blades of segmental or ring-type cutters or of cutters whose blades are integral with the cutter head. The third described method may be used for the grinding of blades of these different types of cutters, but it has the disadvantage in such cases that the sides of the blades can be relief-ground back only a relatively short distance because of the necessity of preventing the wheel from interfering with one blade of a cutter when it is grinding another blade of the cutter. Hence the blades have only a relatively short useful life. The possibility of interference arises because of the reciprocating motion employed for the relief-grinding.

Cutters having a plurality of blades integral with one another have come more and more into use in recent years, especially segmental and ring type cutters.

The primary object of the present invention is to provide a method of relief-grinding which will be suitable for relief-grinding the side surfaces of the blades of segmental and ring type face-mill gear cutters and of cutters whose blades are integral with the cutter head.

A further object of the invention is to provide a method for grinding the relieved side surfaces of segmental and ring type cutters and of cutters whose blades are integral with the cutter head which will permit of relief-grinding the whole of the side surfaces of the blades from front to rear.

Still another object of the invention is to provide a method for relief-grinding the blades of face-mill gear cutters which may be employed in the grinding of the blades of any cutters of this type and which will produce blades having side surfaces of correct pressure angle throughout their life.

Other objects of the invention will be apparent hereinafter from the specification and from the recital of the appended claims.

In the relief grinding process of the present invention, segmental cutting blades or the blades of a cutting ring may be ground with the segments or the ring secured to their head. It is preferred, however, to grind the inside surfaces of the blades in a dummy head. For the relieving process, a grinding wheel is used which has an operating profile of circular arcuate shape. The grinding wheel is so dressed or positioned relative to a blade that the center of its operating profile is offset from the center of the segment or ring or head in which the blade is secured. The grinding wheel is then rotated and reciprocated relative to the blade along an element of one side surface of the blade. If the side surface of the blade is of straight profile, and of positive pressure angle, a side surface will be ground on the blade which is cylindrical and whose axis is offset from and inclined to the axis of the segment or ring or head. Thus, cutting clearance will be produced on the side surface of the blade. When one blade has been ground, the grinding wheel is withdrawn from engagement with the blade and the head is indexed to bring another blade into operative position to be ground. For the outside surfaces of the blades, a grinding wheel of concave profile is used and for the inside surfaces of the blades, a grinding wheel of convex profile shape is used.

In the drawings:

Fig. 7 is a plan view of a machine built according to one embodiment of this invention for grinding the cutting clearance on the sides of blades of a face-mill gear cutter.

Figure 1:
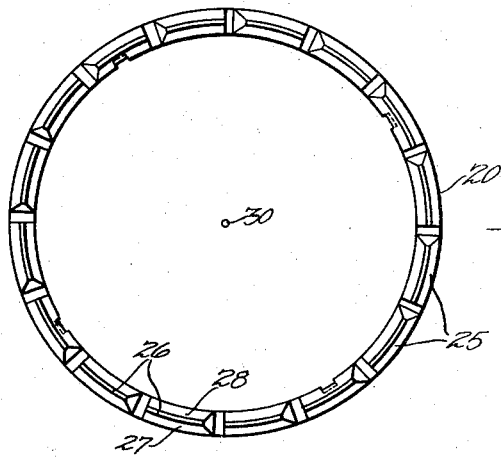
Fig. 1 is a plan view of a face-mill gear cutter having its cutting blades formed in an integral ring, and such as may be relief-ground with advantage by the method of the present invention.
Figure 2:
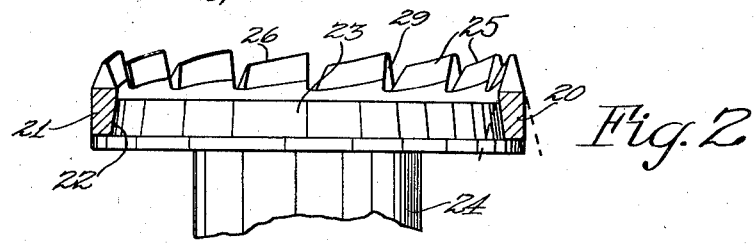
Fig. 2 is a sectional view of this cutter, showing the cutter mounted on the spindle of a gear cutting machine.

Figs. 1 and 2 show one type of face-mill gear cutter whose blades may be relief ground with advantage by the method of the present invention. The cutter, which is designated at 20, has its cutting portion in the form of a continuous, closed ring. The body portion 21 of this ring is formed with an internal conical surface 22 to fit the tapered nose 23 or cutter head of the cutter spindle 24 of the gear cutting machine on which the cutter is to be used and the ring may also be formed with an external conical surface 46 for a purpose which will hereinafter appear.

The cutting portion of the ring is formed with converging sides and is gashed at intervals to form the cutting teeth or blades 25. In the preferred construction, the ring is so shaped that the body portion 21 of the ring lies wholly within the wedge-shaped space defined by the dotted line extensions (shown in Fig. 2) of the sides of the cutting portion of the ring. This permits the cutting teeth to be readily sharpened.

To provide cutting clearance, the tops 26 and the sides 27 and 28 of the cutting blades 25 are relieved back of the front faces 29 of the blades.

Figure 3:
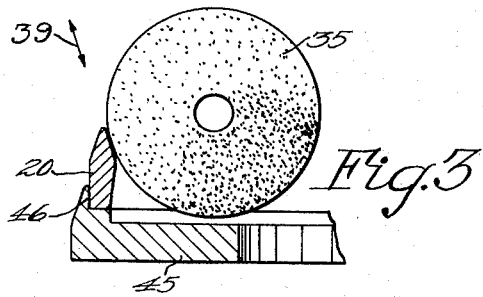
Fig. 3 is a fragmentary sectional view and Fig. 4 a fragmentary plan view, illustrating the method of grinding the cutting clearance on the inside surfaces of the blades of a ring or segmental type cutter according to this invention.
Figure 4:
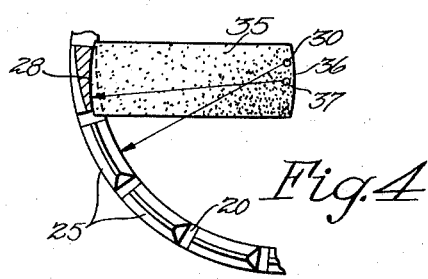

Figs. 3 and 4 show how the inside surfaces 28 of the teeth 25 may be relief-ground by the process of the present invention. For this purpose a grinding wheel 35 is employed that has a convex operating surface 36 of circular arcuate shape. The grinding wheel is so dressed or positioned relative to a blade that the center 37 of the arc 36 is offset from the center 30 of the cutting ring. The grinding wheel 35 is then reciprocated relatively along an element of the side surface 28 of the blade, as indicated by the arrow 39.

In the instance shown, the inside surfaces of the blades of the cutter are of straight profile. Hence, as the rotating grinding wheel is reciprocated up and down the side surface of the blade in the direction of the arrow 39, it will grind a cylindrical side surface on the blade whose axis is offset from the axis 30 of the cutter and passes through the center 37 of curvature of the wheel and is inclined to the axis of the cutter at an angle corresponding to the pressure angle of the side surface 28 of the blade. In this way, a side surface is ground on the inside of the blade that is non-radial of the axis 30 of the cutter and has clearance relative to the inside cutting edge of the blade.

When the inside surface of one blade of the cutter has been ground, the wheel is withdrawn from engagement with the cutter and the cutter is indexed to bring the next cutting blade into position to be ground.

Figure 5:
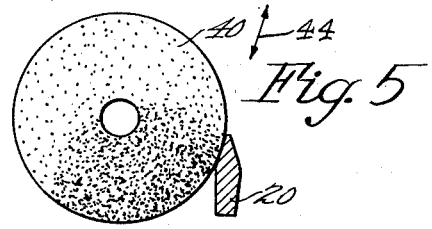
Figs. 5 and 6 are corresponding fragmentary sectional and plan views, respectively, showing the method of grinding the cutting clearance on the outside surfaces of the blades.
Figure 6:
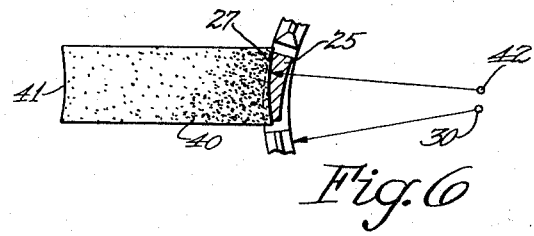

The method of grinding the outside surfaces 27 of the blades is illustrated in Figs. 5 and 6. Here a grinding wheel 40 is employed that has a concave operating surface 41 which is of circular arcuate shape. In the grinding operation, the grinding wheel is so dressed or positioned relative to a blade of the cutter that the center 42 of the profile of the wheel is offset from the axis 30 of the cutter. In the grinding operation, the grinding wheel is rotated on its axis and simultaneously moved relative to the cutter along an element of the outside surface 27. In the grinding of a cutting blade of straight profile, the grinding wheel is reciprocated along a straight line element of the outside surface 27 in the direction of the arrow 44 and thus an outside surface 27 will be ground upon the cutting blade which has cutting clearance back of the outside cutting edge of the blade and which is a cylindrical surface whose axis passes through the center 42 of curvature of the wheel and is inclined to and offset from the axis 30 of the cutter. As before, after the side surface of one blade of the cutter has been ground, the grinding wheel is moved clear of the cutter and the cutter is indexed to bring another blade into grinding position.

When the radii of the cylindrical surfaces ground on the sides of the blades according to the method of the present invention are properly selected, the cylindrical surfaces will approximate very closely helical surfaces ground by the prior axial relief grinding method or to the conical surfaces ground by the known offset grinding method.

In grinding the inside surfaces of the cutting blades, it is preferable to use a special head such as shown at 45 in Fig. 3 in order to hold the cutting blades to be ground. The blades or the cutting segment or the cutting ring is chucked in this head by the outside surface 46 of its body portion which may be ground slightly conical to fit an internal conical surface formed on the head 45. The head 45 holds the blades or segment or ring, as the case may be, securely and permits free movement of the grinding wheel 35 to grind the inside surfaces of the cutting blades from the top to the bottom thereof. This same head may be used, if desired, in grinding the outside surfaces of the blades, or they may be ground in their own head. By means of the present invention, all the cutting teeth of a segmental cutter or of a ring type cutter may have their side surfaces ground for their full length from front to rear and, moreover, these surfaces may be ground accurately with reference to their common axis of rotation.

In Figs. 4 and 6, the blade being operated upon is shown in section in a plane perpendicular to the axis of the cutter.

Figure 7:
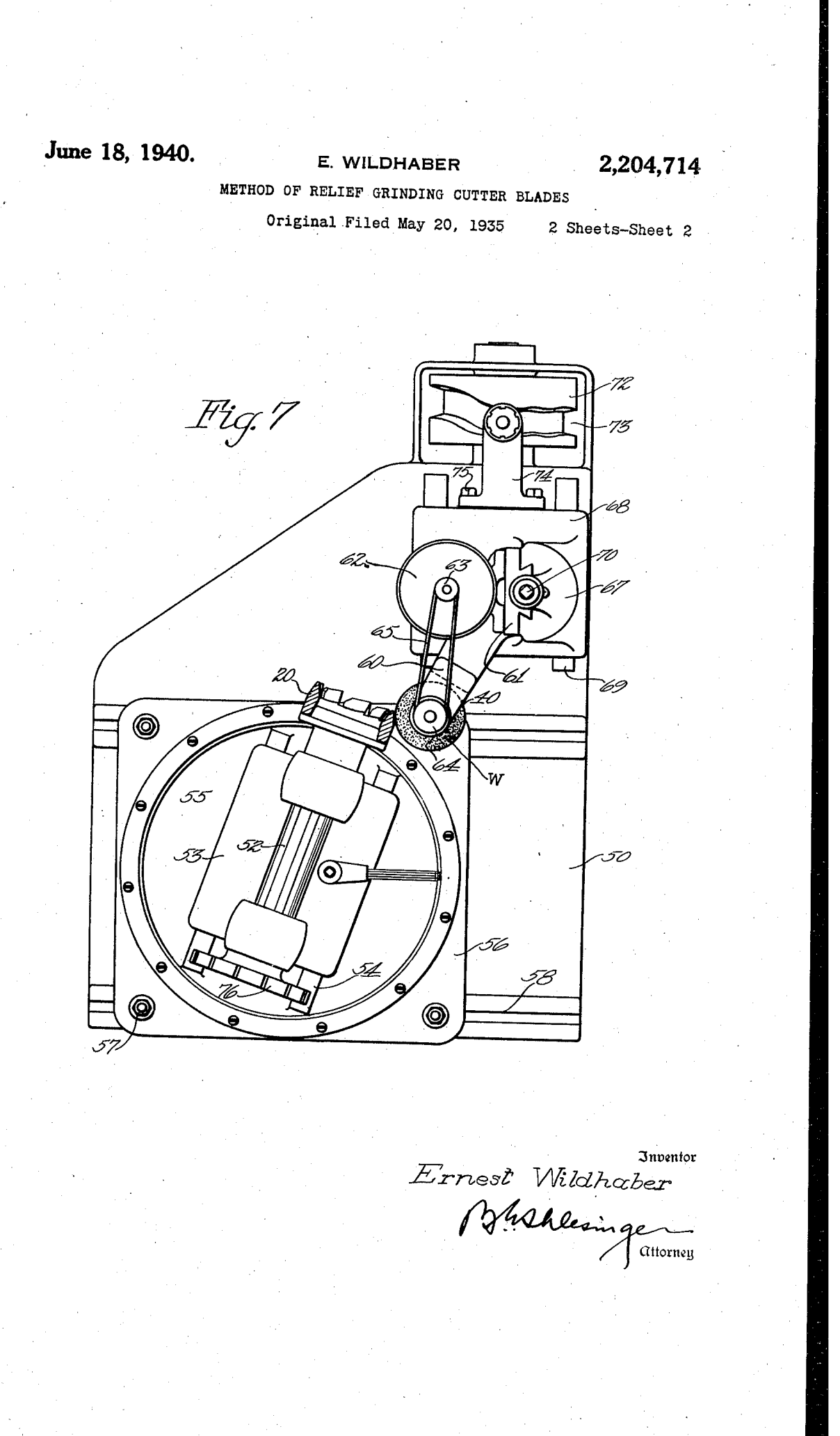

One form of machine for grinding the cutting clearances on the sides of cutting blades by the process of the present invention is shown in Fig. 7. 50 designates the base or frame of this machine. The cutter 20, which is to be ground, is secured in any suitable manner to the work spindle 52 of this machine. The work spindle is journaled in suitable bearings in the work head 53 which is adjustable axially of the spindle on ways 54 that are formed on the upper surface of a rotary turret or table 55. The turret or table 55 is mounted for rotatable adjustment upon a slide 56 that is laterally adjustable upon the base 50 of the machine. The bolts 57 which engage in the T-slots 58, that are formed in the base 50, serve to secure the slide 56 in any position of its lateral adjustment.

The grinding wheel W is journaled in the projecting arm 60 of the slide 61 on which is mounted the motor 62 that drives the grinding wheel. The motor is connected to the grinding wheel by the pulleys 63 and 64 and the belt 65. The slide 61 is vertically adjustable upon the column 67 of a carriage 68 that is slidable on ways 69 formed on the base of the machine. The slide 61 can be adjusted vertically on the column 67 by rotation of the screw shaft 70.

The carriage 68 is reciprocated by a cam 72 which is secured to a shaft that is rotatably mounted in the base of the machine. A roller, which is carried by a bracket 74, engages in the track 73 of this cam. The bracket 74 is secured to the carriage 68 by screws 75.

The cam 72 imparts a reciprocating movement to the grinding wheel which moves the wheel along an element of the side surface of the cutting blade during the grinding thereof and, in addition, periodically withdraws the grinding wheel from operating position to permit indexing of the cutter. To this end, the track 73 of the cam is formed with a series of short alternate rises and depressions which impart a series of short reciprocating movements to the grinding wheel, and with a single long rise, a dwell and a return, to withdraw the grinding wheel from operating position, retain it out of operating position during indexing and return it to operating position again after the indexing has been completed. The index mechanism for the work spindle may be of any suitable type. Preferably, a notched plate type of index mechanism will be employed. The plate of such a mechanism is shown at 76.

When grinding the outside surfaces of cutting blades, a concave grinding wheel such as shown at 40 will be employed, while when grinding the inside surfaces of the cutting blades, a convex type of grinding wheel such as shown at 35 will be used. The angular adjustment of the table 55 permits of setting the cutter to the pressure angle of the side surfaces to be ground on the cutting teeth. The lateral adjustment of the slide 56 allows of moving the cutter head to one side or the other of the grinding wheel depending upon whether the outside or the inside surfaces of the cutting blades are to be ground. The vertical adjustment of the slide 61 upon the column 67 permits of offsetting the center of the operating profile of the grinding wheel relative to the axis of the cutter so as to grind the side surfaces of the cutting teeth with the desired cutting clearance.

In operation, the work is held stationary and the grinding wheel is rotated continuously on its axis from the motor 62 while being simultaneously reciprocated up and down the side surface of a cutting blade by the cam 72. After a series of short strokes, the wheel is withdrawn from engagement with the cutter by action of the cam 72, the work spindle is indexed to bring the next blade into position to be ground, and then the wheel is returned into operative position.

While the invention has been described in connection with particular embodiments thereof, it is capable of various further embodiments and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of grinding clearance on the side surface of a face-mill gear cutter blade back of its side-cutting edge which comprises mounting the blade on a rotary head, positioning a grinding wheel whose operating surface is of curved profile in engagement with the described side-surface of the blade so that the curved surface of the wheel is inclined to a circle, which passes through the side-cutting edge of the blade and is concentric with the head, at an angle corresponding to the angle of side clearance to be ground on the blade, rotating the wheel in engagement with the blade while producing a relative reciprocating movement between the wheel and blade along a line element of the side surface of the blade, and periodically indexing the head to bring successive blades into grinding position.

2. The method of grinding side clearance on the outside surface of a face-mill gear cutter blade which comprises mounting the blade in a rotary head, positioning a grinding wheel whose operating surface is of concave profile, in engagement with the said surface of the blade so that the wheel profile extends in the general direction of the length of the blade and a radius of curvature of the wheel intersects a radius of the head at an angle equal to the clearance angle to be ground on the side surface of the blade, rotating the wheel on its axis and producing a relative reciprocating movement between the wheel and head along a line element of the side surface of the blade.

3. The method of grinding side clearance on the inside surface of a face-mill gear cutter blade whose inside surface is a surface of revolution, which comprises mounting the blade in a rotary head, positioning a grinding wheel whose operating surface is of convex profile in an axial plane in engagement with the inside surface of the blade so that the profile of the operating surface of the wheel extends in the general direction of the length of the blade and the center of curvature of the profile of said operating surface is offset from the axis of the head a distance determined by the clearance angle to be ground on the inside surface of the blade, rotating the wheel on its axis and producing a relative reciprocating movement between the wheel and head in the direction of the height of the blade profile along a line element of the inside surface of the blade.

4. A machine for grinding cutting clearance on a side surface of a face-mill gear cutter blade comprising a work support, a wheel support, a rotary grinding wheel mounted on the wheel support and having an operating portion which is of curved profile, means for positioning the grinding wheel in operative engagement with a side surface of the blade to be ground, means for rotating the grinding wheel on its axis, means for reciprocating the grinding wheel relative to the work in the direction of a line element of the side surface of a blade through a series of short strokes followed periodically by a movement of a longer stroke, and means for indexing the work support on the long strokes of the grinding wheel when the wheel is clear of the work.

5. The method of grinding side clearance on a gear cutter which has blades projecting from a body portion in the general direction of the axis of the cutter, which consists in mounting a grinding wheel having a curved profile in an axial section in engagement with a side surface of a blade so that the wheel profile extends in the general direction of the length of the blade, in rotating the grinding wheel and in providing bodily relative motion between the grinding wheel and the cutter in the general direction of the height of said side surface.

6. The method of grinding side clearance on a gear cutter which has blades projecting from a body portion in the general direction of the axis of the cutter, which consists in mounting a grinding wheel having a curved profile in an axial section in engagement with a side surface of a blade so that the wheel profile extends in the general direction of the length of the blade, in rotating the grinding wheel, and in providing bodily relative motion between the wheel and cutter in a direction perpendicular to the axis of the wheel.

7. The method of grinding side clearance on the inside and outside surfaces of face-mill gear cutter blades which comprises grinding the inside and outside surfaces of the blades with separate grinding wheels, each of which has an active surface of circular arcuate profile in an axial plane, by positioning each wheel in engagement with a side surface of a blade of the cutter so that the profile of the wheel extends in the general direction of the length of the blade from front to rear, and rotating the wheel on its axis while producing a relative movement between the wheel and blade in the direction of the profile of the blade, and periodically indexing the cutter to bring successive blades into grinding position, the wheel used for grinding the outside surfaces of the blades being of concave circular arcuate profile shape in an axial plane and being positioned so that the center of curvature of its profile is offset to one side of the cutter axis and the wheel used for grinding the inside surfaces of the blades being of convex circular arcuate profile shape in an axial plane and being positioned so that the center of curvature of its profile is offset to the opposite side of the cutter axis.

ERNEST WILDHABER.